Sept. 17, 1963  E. LONG  3,104,217
FUEL ELEMENT DISCHARGE SYSTEMS FOR NUCLEAR REACTOR
Filed June 24, 1958
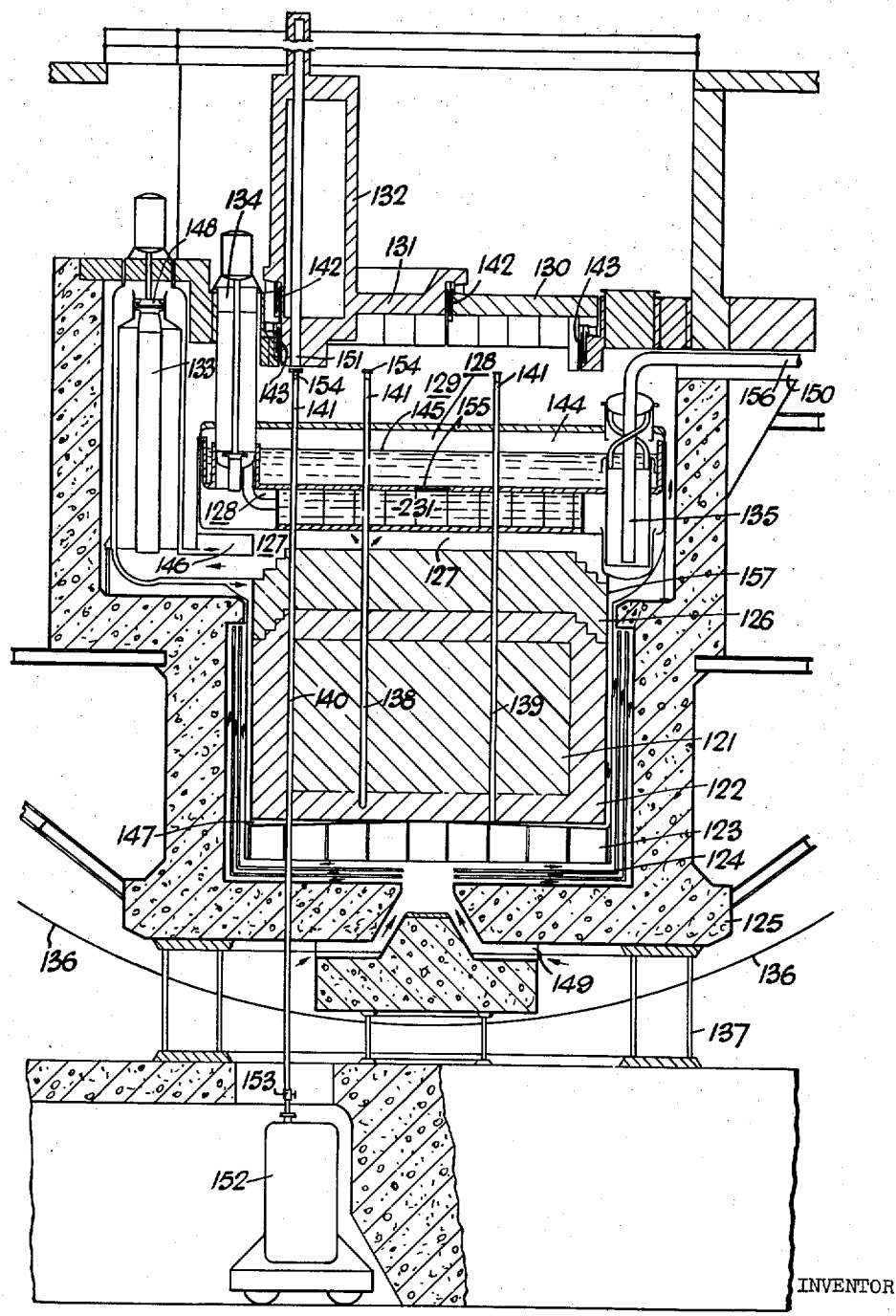
INVENTOR
EVERETT LONG
BY Larson and Taylor
ATTORNEYS

United States Patent Office 3,104,217
Patented Sept. 17, 1963

3,104,217
FUEL ELEMENT DISCHARGE SYSTEMS FOR NUCLEAR REACTORS
Everett Long, Culcheth, near Warrington, England, assignor to United Kingdom Atomic Energy Authority, London, England
Filed June 24, 1958, Ser. No. 744,135
Claims priority, application Great Britain June 24, 1957
1 Claim. (Cl. 204—193.2)

This invention relates to nuclear reactors and it is concerned with the discharging of fuel elements from vertically orientated nuclear reactors by access from the top of the reactor. It has application in the sodium-graphite reactor disclosed in detail in a copending application, Serial No. 744,185, of even date, filed in the names of Long and Challender, and now U.S. Patent No. 3,000,-728.

Three principal methods have been adopted for discharging fuel elements by access from the top of a nuclear reactor. In one method a discharge machine travels over the top of the reactor in two coordinate directions giving access to all the fuel element channels and then has its travel extended to reach a discharge chute in the reactor shield through which the discharge fuel elements can be lowered into a shielded receptacle. In another but somewhat similar method a discharge machine is manipulated by a crane to move between points of access to fuel element channels (where it is loaded with discharged fuel) and a discharge chute for lowering the fuel elements through the shield. The third method involves a double-wheel scanning device having one wheel eccentrically mounted in the other to give access to the whole top of the reactor and a discharge machine moves with the wheels but is demountable so that it can be hoisted to a discharge chute.

In the above methods one or other of the following problems arise: first, in penetrating the reactor shield to obtain access to the reactor by a discharge machine there is an element of a risk of exposing the operator to the contents of the reactor or allowing some of the contents to escape, or in allowing air into the reactor; second, in lifting operations using a crane a big heavy load has to be carried, a typical discharge machine, being a heavy shielded article, may have a weight of about 100 tons; third, in moving fuel from a discharge machine into a chute further exposure may occur. These problems are aggravated where the reactor uses liquid sodium as a coolant owing to the reactivity of the sodium.

According to the present invention, a vertically orientated nuclear reactor having a fuel element manipulating machine mounted on a wheel so as to be movable over the top face of the reactor, the wheel and the machine together forming part of the reactor shielding above the reactor, characterized in that there is provided a channel for discharged fuel elements through the reactor from a point above the reactor and inside the shield to a remote point below the reactor and outside the shield so that fuel elements can be removed from the reactor and passed through said channel without violating the reactor shielding above the reactor.

The invention will now be described with reference to the accompanying drawing which is a diagrammatic sectional view through a sodium-cooled, graphite-moderated nuclear reactor.

In the drawing a nuclear reactor core 121 surrounded by a reflector 122 is supported in a containment vessel 157 on a grid 123 within a thermal shield 124 and radiation shield 125. Above the core 121 and reflector 122 there is a neutron shield 126, a gas space 127 for the moderator coolant, a tank 128 for the fuel element coolant sodium, another gas space 129 and a rotatable gamma shield 130 in the shape of a wheel containing an eccentric wheel 131 on which is mounted a fuel element manipulating machine 132 for carrying out the various operations involved in charging and discharging fuel elements from the core 121. A heat exchanger 133 for the moderator coolant, a pump 134 for the sodium and a heat exchanger 135 for primary and secondary sodium circuits are also shown. The whole reactor is enclosed in a sphere 136 and is supported on a frame 137.

Considering the drawing in more detail, the reactor core 121 is pierced by double walled fuel element channels 138 and control rod channels 139, only one of each being shown for the sake of clarity. A single fuel element discharge channel 140 passes between the reactor core 121 and reflector 122, then through the shields 124, 125 and sphere 136 to a shielded flask 152 which can be connected to the channel 140. The discharged fuel elements are loaded into the flask 152 for removal to a storage area. A valve 153 is provided to close off the channel 140 in the absence of the flask 152. The channels 138, 139 and 140 pass through the reflector 122, neutron shield 126 and sodium tank 128 into the gas space 129 where they finish in stand pipes 141 having closure plugs 154. The pipes 141 can be connected to a channel 151 in the machine 132 by rotating the wheel 131 and gamma shield 130. The wheel 131 is sealed in the gamma shield 130 by mercury dip seals 142 and the shield 130 is sealed to the concrete radiation shield 125 by mercury dip seals 143.

The sodium tank 128 is divided laterally into upper and lower chambers 144, 231. The lower chamber 231 acts as a header tank for cool sodium at approximately 335° C. and the upper chamber 144 acts as a storage tank for hot sodium at approximately 525° C. Thermal insulation 155 is provided between the upper and lower chambers of the tank 128 and between the upper chambers 144 and the gas space 129. The sodium level in the upper chamber 144 is indicated by the line 145. The fuel element channels 138 are separated by sleeves shown in copending application Serial No. 744,208 into outer annuli and inner channels containing the fuel elements. By means of the pump 134 hot sodium is pumped from the upper chamber of the tank 128 into the lower chamber 231 via the heat exchanger 135, where it gives up heat to inactive sodium flowing in the secondary sodium circuit through pipes 156. Sodium from the lower chamber of the tank 128 then flows down the outer annulae of the fuel element channels 138 and returns to the upper chamber of the tank 128 over the fuel elements in the inner channels.

The graphite moderator in the reactor core and reflector is cooled separately from the fuel by nitrogen gas which gives up its heat to a sodium potassium alloy in the heat exchanger 133. From the heat exchanger 133 the nitrogen flows into an annulus 146, down the outside of the reflector 122 and into a tapered manifold 147. It then flows up through the graphite of the core (in particular around the outer annulae of the fuel element channels 138) into the gas space 127 above the neutron shield and is pumped back into the heat exchanger 133 by a pump 148. The thermal shield 124 is also cooled by nitrogen which enters through passages 149 in the concrete shield 125 and leaves by a channel 150.

To discharge fuel elements from the reactor the gamma shield 130 and wheel 131 are rotated until the channel 151 in the machine 132 is over the appropriate standpipe 141. A joint is then made between the channel 151 and the standpipe 141. This joint is vacuum tested and the plug 154 is then removed and stored in the machine 132. The fuel element is raised in its channel 138 to a position outside the core 121 but below the sodium level 145 and held by the machine 132 in that position for twelve hours to "cool-off." After twelve hours the heat dissipation has dropped to 1% of its normal value and the element is relatively cool. It is then taken into the machine 132. A new fuel element is lowered into the channel 138, the plug 154 is replaced in the standpipe 141 and the shield 130 and wheel 131 rotated again until the machine 132 is directly over the discharge channel 140. The fuel elements stored in the machine 132 are then lowered through the channel 140 to the flask 152 where they can be handled with safety.

I claim:

A nuclear reactor comprising a radiation shield structure defining a chamber, a reactor core assembly disposed in said chamber and having its upper face separated from the top portion of the shield structure by a space, said core assembly defining vertically oriented fuel channels terminating in said space, means defining a fuel element discharge channel extending from a discharge point below the shield structure upwardly therethrough into the chamber and terminating in said space, said top portion of the shield structure having an aperture therein intersected by the respective axes of the fuel channels and the fuel element discharge channel, a rotatable radiation shield closing said aperture, and fuel element manipulating means mounted eccentrically on the rotatable radiation shield for movement between the respective terminal ends of the fuel channels and the fuel element discharge channel.

References Cited in the file of this patent

UNITED STATES PATENTS 2,863,815    Moore et al. _____ Dec. 9, 1958

FOREIGN PATENTS 789,022    Great Britain _____ Jan. 15, 1958

OTHER REFERENCES

McLain et al.: "Problems in Nuclear Engineering," vol. 1, pp. 267–277; edited by Hughes et al., Permagon Press, June 28, 1957.